United States Patent [19]
Buccieri et al.

[11] Patent Number: 5,826,846
[45] Date of Patent: Oct. 27, 1998

[54] MONITOR ARM WITH CONSTANT COUNTERBALANCE

[75] Inventors: Michael Buccieri, Greenfield, Ind.;
Teddy L. Johnson, Palm Bay, Fla.;
John W. Ruehl, Shelbyville; John D. Vogel, Columbus, both of Ind.

[73] Assignee: Hill-Rom, Inc., Batesville, Ind.

[21] Appl. No.: 671,609

[22] Filed: Jun. 28, 1996

[51] Int. Cl.⁶ .................................................. E04G 3/02
[52] U.S. Cl. ................................ 248/280.11; 248/284.1; 248/292.11; 248/278.1
[58] Field of Search .......................... 248/278.1, 280.11, 248/284.1, 292.11, 292.13, 123.11

[56] References Cited

U.S. PATENT DOCUMENTS

| | | | |
|---|---|---|---|
| 860,303 | 7/1907 | Jones ...................................... | 248/278.1 |
| 1,686,341 | 10/1928 | Nathanson ............................ | 248/284.1 |
| 3,012,781 | 12/1961 | Nelson ............................ | 248/292.11 X |
| 3,272,928 | 9/1966 | Hainzelin .......................... | 248/278.1 X |
| 3,584,793 | 6/1971 | Ilzig . | |
| 3,820,752 | 6/1974 | Oram . | |
| 4,080,530 | 3/1978 | Krogsrud . | |
| 4,160,536 | 7/1979 | Krogsrud ......................... | 248/123.11 X |
| 4,166,602 | 9/1979 | Nilsen et al. ....................... | 248/280.11 |
| 4,208,028 | 6/1980 | Brown et al. ................... | 248/123.11 X |

(List continued on next page.)

FOREIGN PATENT DOCUMENTS

| | | |
|---|---|---|
| 0 312 355 A2 | 4/1989 | European Pat. Off. . |
| 0 508 178 A1 | 10/1992 | European Pat. Off. . |

OTHER PUBLICATIONS

Computer Mounting Solutions, Medaes Architectural & Engineering Systems brochure, 2 pages, 1996.
Computer Hardware Management Systems, Medaes Architectural & Engineering Systems brochure, 4 pages, 1996.
Physiological Monitoring Management Systems—Track Mounted SuspensionArms, Medaes Architectural & Engineering Systems brochure, 5 pages, date unknown.
Ergotron®, Inc., Computer WorkCenters and LAN Racking Systems, Catalog No. FLC. Jan. 1, 1994.
Ergotron®, Inc., Your Total Computer Management Solution for Manufacturing Automation, date unknown.
Ergotron®, Inc., Command Post™ Adjustable Systems, Brochure No. CPS Jan. 15, 1995.
Ergotron®, Inc., Power Lift 2000™ Computer WorkCenter, Catalog No. POW Feb. 25, 1995.
Ergotron®, Inc., Ergotron Computer Mounting Solutions, 1995.

*Primary Examiner*—Daniel P. Stodola
*Assistant Examiner*—Gregory J. Strimbu
*Attorney, Agent, or Firm*—Barnes & Thornburg

[57] ABSTRACT

A monitor arm includes a mounting assembly adapted to be coupled to a support structure and a parallelogram mechanism coupled to the mounting assembly. The parallelogram mechanism includes a support member adapted to couple to an object, such as a computer monitor, a first arm pivotably coupled to the mounting assembly at a first pivot axis and pivotably coupled to the support member at a second pivot axis, and a second arm pivotably coupled to the mounting assembly at a fifth pivot axis and pivotably coupled to the support member at a fourth pivot axis. The monitor arm includes a counterbalancer having a first end coupled to the mounting assembly at a third pivot axis and a second end coupled to the first arm at the second pivot axis. The third pivot axis is vertically above and vertically aligned with the first and fifth pivot axes. The mounting assembly includes an adjustment mechanism for adjusting the position of the third pivot axis relative to the first and fifth pivot axes to adjust a counterbalancing force exerted on the parallelogram mechanism by the counterbalancer.

31 Claims, 6 Drawing Sheets

U.S. PATENT DOCUMENTS

| | | |
|---|---|---|
| 4,453,687 | 6/1984 | Sweere . |
| 4,494,177 | 1/1985 | Matthews . |
| 4,523,732 | 6/1985 | Biber et al. . |
| 4,744,019 | 5/1988 | Krogsrud . |
| 4,770,384 | 9/1988 | Kuwazima et al. . |
| 4,836,478 | 6/1989 | Sweere ............................ 248/280.11 X |
| 4,844,387 | 7/1989 | Sorgi et al. ...................... 248/284.1 X |
| 5,025,359 | 6/1991 | Saluja et al. . |
| 5,108,063 | 4/1992 | Koerber, Sr. et al. . |
| 5,186,337 | 2/1993 | Foster et al. . |
| 5,340,072 | 8/1994 | Halbirt ............................ 248/280.11 X |
| 5,348,260 | 9/1994 | Acevedo ............................ 248/280.11 |
| 5,603,496 | 2/1997 | Rappaport ........................ 248/284.1 X |
| 5,618,090 | 4/1997 | Montague et al. ...................... 312/209 |

MONITOR ARM WITH CONSTANT COUNTERBALANCE

BACKGROUND AND SUMMARY OF THE INVENTION

The present invention relates to supports for supporting objects in spaced-apart relation with support structures, and particularly to a monitor arm with constant counterbalance for supporting an object such as a monitor in a position spaced apart from the support structure. More particularly, the present invention relates to monitor arms for supporting objects such as a cathode ray tube monitor connected to computerized equipment so that the monitor is positionable relative to the support structure to which the arm is coupled for easy viewing of the monitor by the user.

Arms for mounting and supporting computer and television monitors relative to a wall, a column, or another support structure are well known. Conventional mounting arms are typically mounted to the support structure so that the monitor can be moved between a stored position adjacent to the support structure and a viewing position spaced apart from the support structure. See, for example, U.S. Pat. No. 5,108,063 to Koerber, Sr. et al., that is assigned to the assignee of the present invention, and that discloses an extendable and retractable computer mounting arm for mounting a computer to the wall of a patient treatment room. When the computer mounting arm is in the retracted position the computer is stored close to the wall and when the computer mounting arm is in the extended position the computer is spaced apart from the wall.

Some conventional mounting arms rely on frictional contact between moving parts to hold the monitor in the desired position relative to the support structure. Such systems require that the frictional forces overcome the force of gravity acting on the mounting arm and the monitor carried by the mounting arm.

Other conventional mounting arms include springs or other biasing means to counterbalance at least a portion of the weight supported by the mounting arm. See, for example, U.S. Pat. No. 4,836,478 to Sweere which discloses a parallelogram arm assembly having a pneumatic pressure cylinder positioned to lie between upper and lower support arms of the parallelogram arm assembly and extending generally diagonally from an upper support arm of the parallelogram arm assembly to an adjustment slide that can be moved along a non-horizontal and non-vertical guide channel to extend and contract the pneumatic cylinder. The adjustment mechanism adjusts the pressure exerted by the pneumatic cylinder.

Mounting arms having adjustable biasing mechanisms can experience either "over counterbalance" or "under counterbalance" through part of the vertical range of motion of the arm tending to move the monitor supported by the mounting arm away from the desired position. Such mounting arms may include a locking device or some other device for creating an additional friction force to overcome the over or under counterbalance condition so that the arm holds the monitor at the desired position. What is needed is a monitor arm that counterbalances the weight carried by the monitor arm throughout the complete range of motion for monitors of various weights carried by the arm without the need for additional locking or friction devices or friction connections between moving parts to keep the monitor in the desired position relative to the support structure.

According to the present invention an arm mechanism is provided for supporting an object in spaced-apart relation from a support structure. The arm mechanism includes a rigid arm having a first end pivotably coupled to the support structure for pivoting movement about a generally horizontal first pivot axis between a downward lowered position and an upward raised position. A support mechanism is provided for coupling the object to the rigid arm for pivoting movement about a generally horizontal second pivot axis that is spaced apart from the first pivot axis. The rigid arm cooperates with the support mechanism to position the monitor so that the center of gravity of the monitor is fixed relative to the second pivot axis when the rigid arm moves between the upward raised position and the downward lowered position.

A counterbalancing mechanism for counterbalancing the weight of the monitor and the weight of the arm mechanism is coupled to the rigid arm and coupled to the support structure so that the rigid arm automatically remains stationary when placed in a desired position between the raised position and the lowered position. The counterbalancing mechanism is positioned to lie above the rigid arm and includes a first end pivotably coupled to the support structure for pivoting movement about a generally horizontal third pivot axis and a second end pivotably coupled to the rigid arm for pivoting movement about the second pivot axis.

In preferred embodiments, the monitor arm is attached to a support structure such as a wall, a stand, or another structure for supporting both the monitor arm and the monitor carried by the monitor arm. While the monitor arm can support any object of interest having a weight within limits dictated by the counterbalancing mechanism, it is anticipated that most users of the monitor arm will use the monitor arm to carry a monitor, for example, a cathode ray tube (CRT) monitor for computer equipment. Thus, the meaning of the word "monitor" as used in this specification and in the claims should be taken to include any object that is carried by the monitor arm.

The monitor arm extends away from the support structure to an end spaced apart from the support structure and carrying the monitor for vertical movement relative to the support structure between a downward lowered position and an upward raised position. The monitor and the end of the monitor arm can be repositioned by simply grasping the monitor or the monitor arm and repositioning the monitor to the desired location. After the monitor and monitor arm are repositioned and are released, the monitor will remain in the desired location without the need to fasten a locking device or tighten a friction device. Instead, the monitor arm and the monitor are held in the desired location by a counterbalancing assembly that automatically counterbalances the weight of the monitor arm and the monitor throughout the vertical range of motion of the monitor arm.

If desired, the monitor arm can be mounted to the support structure by a bracket allowing side-to-side movement of the monitor arm. For example, if the bracket is a hinged bracket, the end of the monitor arm can pivot relative to the support structure from side-to-side in addition to moving vertically so that the monitor can be positioned at the desired location selected from an infinite number of positions within the vertical and side-to-side range of movement of the monitor arm.

The monitor arm includes a rigid arm having a first end pivotably mounted to the support structure and a second end spaced apart from the first end. An extendable counterbalancing assembly has a first end pivotably mounted to the support structure at a position spaced apart from the first end of the rigid arm and a second end spaced apart from the first end and pivotably coupled to the second end of the rigid arm. Thus, the rigid arm and the counterbalancing assembly are coupled to one another and cooperate with the support structure to define a generally triangular arrangement. Preferably, the second end of the counterbalancing assembly is coupled to the second end of the rigid arm for pivoting movement about a pivot pin.

A support block is attached to the monitor arm for carrying the monitor and is positioned to lie so that the center of gravity of the monitor is fixed relative to the pivot pin. In addition, the support block is coupled to the rigid arm by a mechanism for maintaining the center of gravity of the monitor at its fixed position relative to the pivot pin as the monitor arm and the monitor move relative to the support structure so that the counterbalancing assembly can counterbalance the weight of the monitor without assistance from a latching mechanism or a frictional coupling between moving parts of the monitor arm.

The counterbalancing assembly includes a "linear force-providing" element which imparts an upward force on the rigid arm at the pivot pin and urges the rigid arm to pivot upwardly relative to the support structure. The counterbalancing assembly can be adjusted, preferably by changing the position of the first end of the counterbalancing assembly relative to the first end of the rigid arm, so that the force created by the linear force-providing element counterbalances the weight of the monitor and the weight of the arm assembly when used with a variety of different monitors having different weights. Once the counterbalancing assembly has been properly adjusted to counterbalance the monitor supported by the monitor arm, the monitor supported by the monitor arm can be moved to a desired position and the monitor will automatically stay in the desired position without the need to further adjust the counterbalancing assembly.

As the vertical position of the monitor changes and the monitor arm pivots relative to the support structure, the component of the force due to gravity acting to pivot the monitor arm downwardly away from the desired position also changes. However, the linear force-providing element exerts an upward opposing force on the rigid arm carrying the monitor. By keeping the center of gravity of the monitor at a position fixed relative to the pivot pin coupling the counterbalancing assembly to the rigid arm, the changes of the component of the force due to gravity acting to pivot the monitor arm downwardly away from the desired position are compensated by the linear force-providing element. Thus, the monitor and the monitor arm can be vertically and laterally repositioned and will stay in the new desired location when released by the user without the need to latch or lock a holding assembly and without the use of friction couplings to counteract forces.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
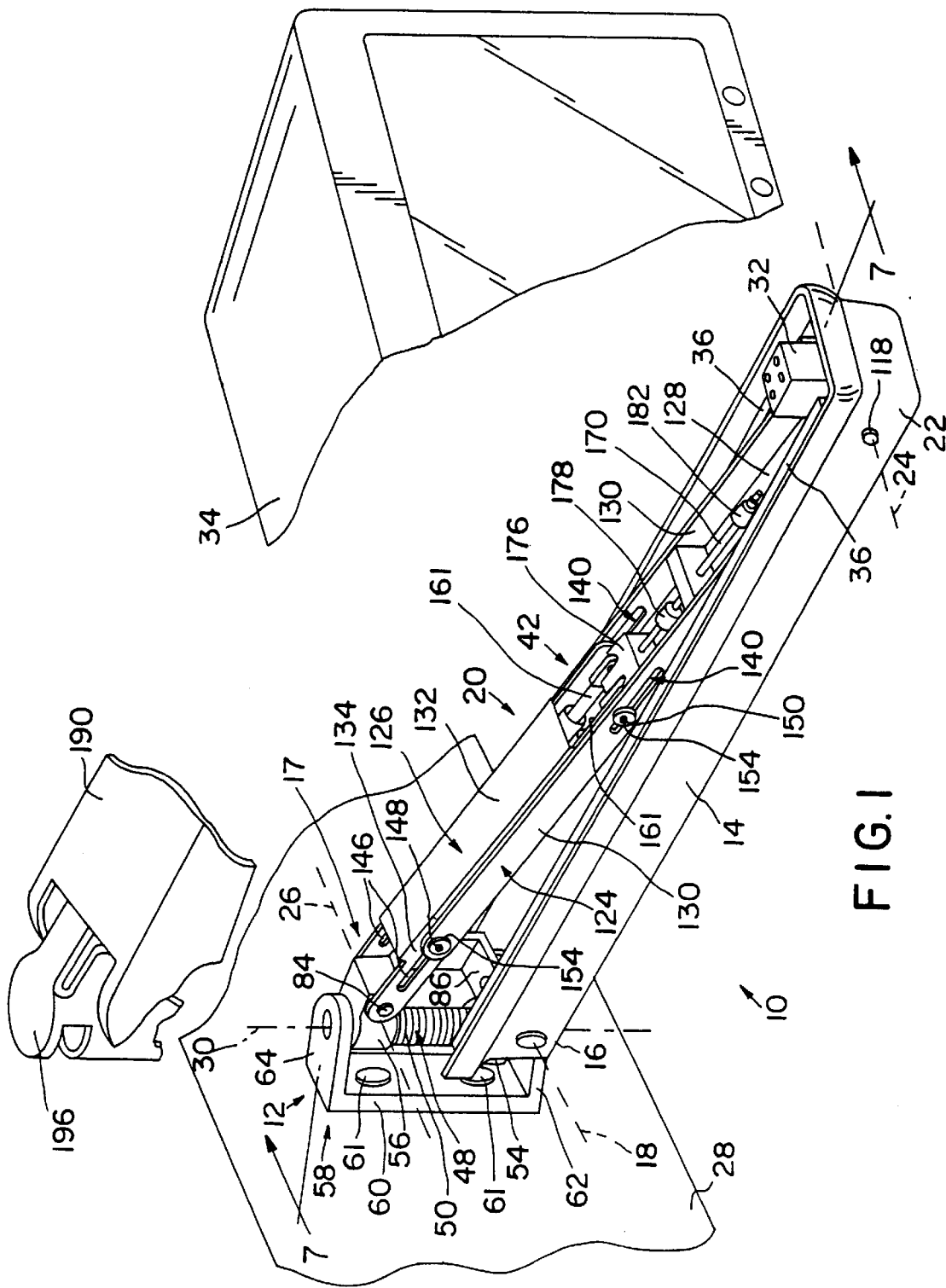
FIG. 1 is a perspective view of a monitor arm in accordance with the present invention with portions broken away showing a mounting bracket assembly mounted to a support structure such as a wall, a lower rigid arm having a first end mounted to the mounting bracket assembly for pivoting movement about a generally horizontal first pivot axis and extending outwardly therefrom to a second end, a counterbalancing assembly positioned to lie above the rigid arm and having a first end mounted to the mounting bracket assembly at a position spaced apart above the first end of the rigid arm for pivoting movement about a generally horizontal third pivot axis and a second end coupled to the second end of the rigid arm for pivoting movement about a generally horizontal second pivot axis, a support block pivotably mounted to the rigid arm and to the counterbalancing assembly at the second end of the rigid arm, and a computer monitor supported by and mounted to the support block of the arm assembly, the counterbalancing assembly having first and second frame members coupled to one another for linear sliding movement and a pair of side-by-side gas springs coupled to the first and second frame members.

An illustrative arm mechanism or monitor arm 10 in accordance with the present invention for supporting an object 34 includes a mounting bracket assembly 12 that can be rigidly attached to a wall, a column, a stand, or any other stable support structure capable of supporting monitor arm 10 and object 34 as shown in FIG. 1, hereinafter referred to as wall 28. While illustrative mounting bracket assembly 12 is fixed to wall 28, it is within the scope of the invention as presently perceived for mounting bracket assembly 12 to be mounted to wall 28 for movement with respect thereto. For example, mounting bracket assembly 12 can include rollers or sliding elements which engage tracks or channels formed in wall 28 so that monitor arm 10 can be moved along the tracks or channels.

Monitor arm 10 includes a rigid arm 14 having a first end 16 mounted to mounting bracket assembly 12 for pivoting movement about a generally horizontal first pivot axis 18 and a second end 22 spaced apart from first end 16 as shown in FIG. 1. A counterbalancer or counterbalancing assembly 20 has a first end 17 mounted to mounting bracket assembly 12 and spaced apart from first end 16 of rigid arm 14 and a second end 23 mounted to a second end 22 of rigid arm 14 for pivoting movement about a generally horizontal second pivot axis 24. First end 17 of counterbalancing assembly 20 connects to mounting bracket assembly 12 for pivoting movement about a generally horizontal third pivot axis 26. Preferred third pivot axis 26 is positioned to lie vertically above first pivot axis 18.

Figure 8:
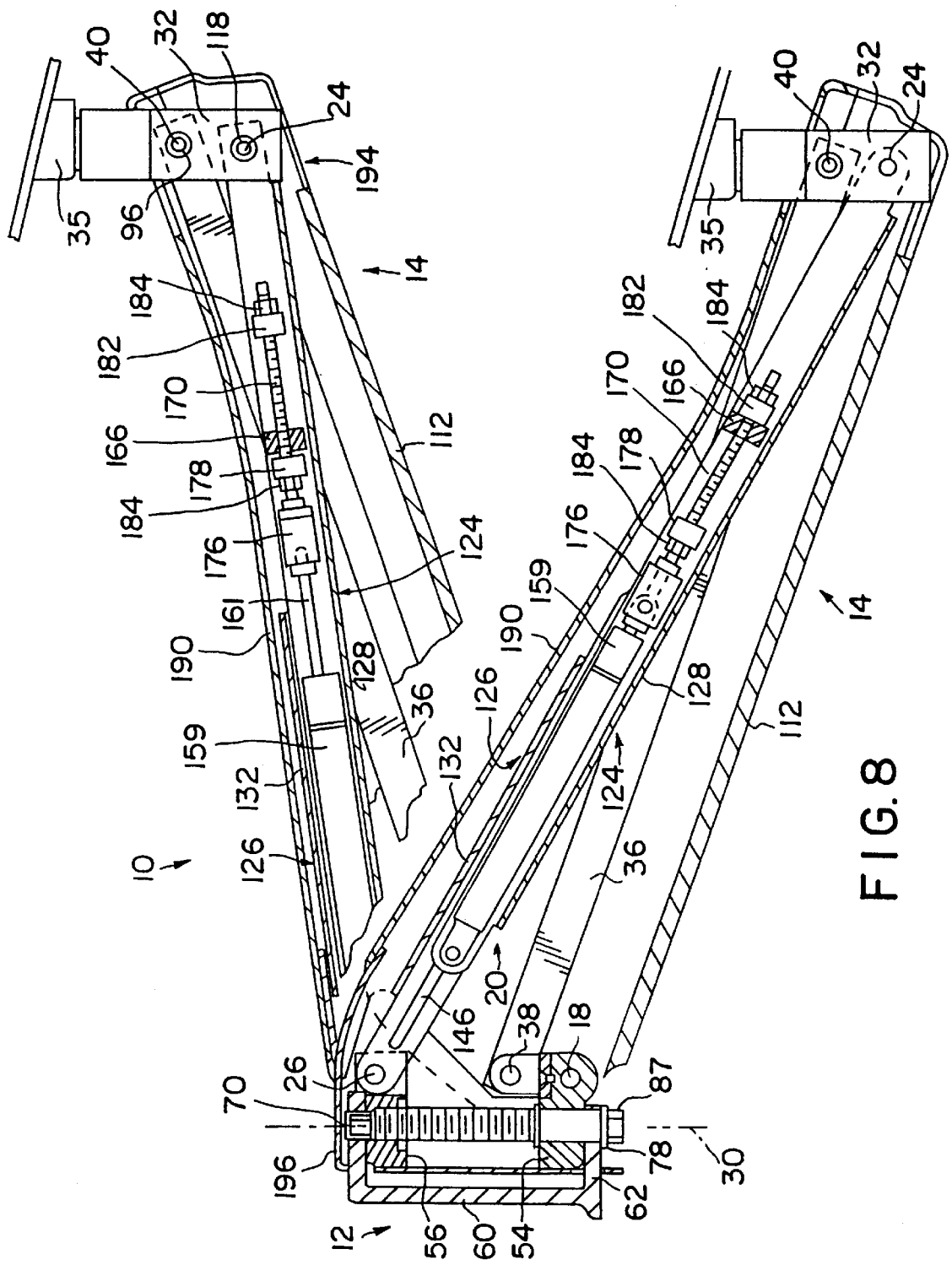
FIG. 8 is a view similar to FIG. 7 showing the rigid arm in the downward lowered position and alternatively in the upward raised position, the downward limiter engaging the stop block when the rigid arm is in the downward lowered position to limit the downward movement of the monitor arm, the upward limiter engaging the stop block when the rigid arm is in the upward raised position to limit the upward movement of the monitor arm, and the adjustment screw adjusted so that the top collar is spaced apart from the bottom collar.

Rigid arm 14 can be pivoted about first pivot axis 18 between a downward lowered position having rigid arm 14 angling generally downwardly from mounting bracket assembly 12, as shown best in FIG. 8, and an upward raised position having rigid arm 14 angling generally upwardly from mounting bracket assembly 12, as also shown best in FIG. 8. When rigid arm 14 is pivoted upwardly, counterbalancing assembly 20 contracts and when rigid arm 14 is pivoted downwardly, counterbalancing assembly 20 elongates.

In addition, rigid arm 14 and counterbalancing assembly 20 are mounted to mounting bracket assembly 12 for pivoting movement about a vertical pivot axis 30 defined by an adjustment screw 48 as shown in FIG. 1. Thus, monitor arm 10 includes rigid arm 14 having second end 22 that moves vertically as rigid arm 14 pivots about first pivot axis 18 between the raised position and the lowered position and that swings laterally from side-to-side as rigid arm 14 pivots about vertical pivot axis 30.

Figure 6:
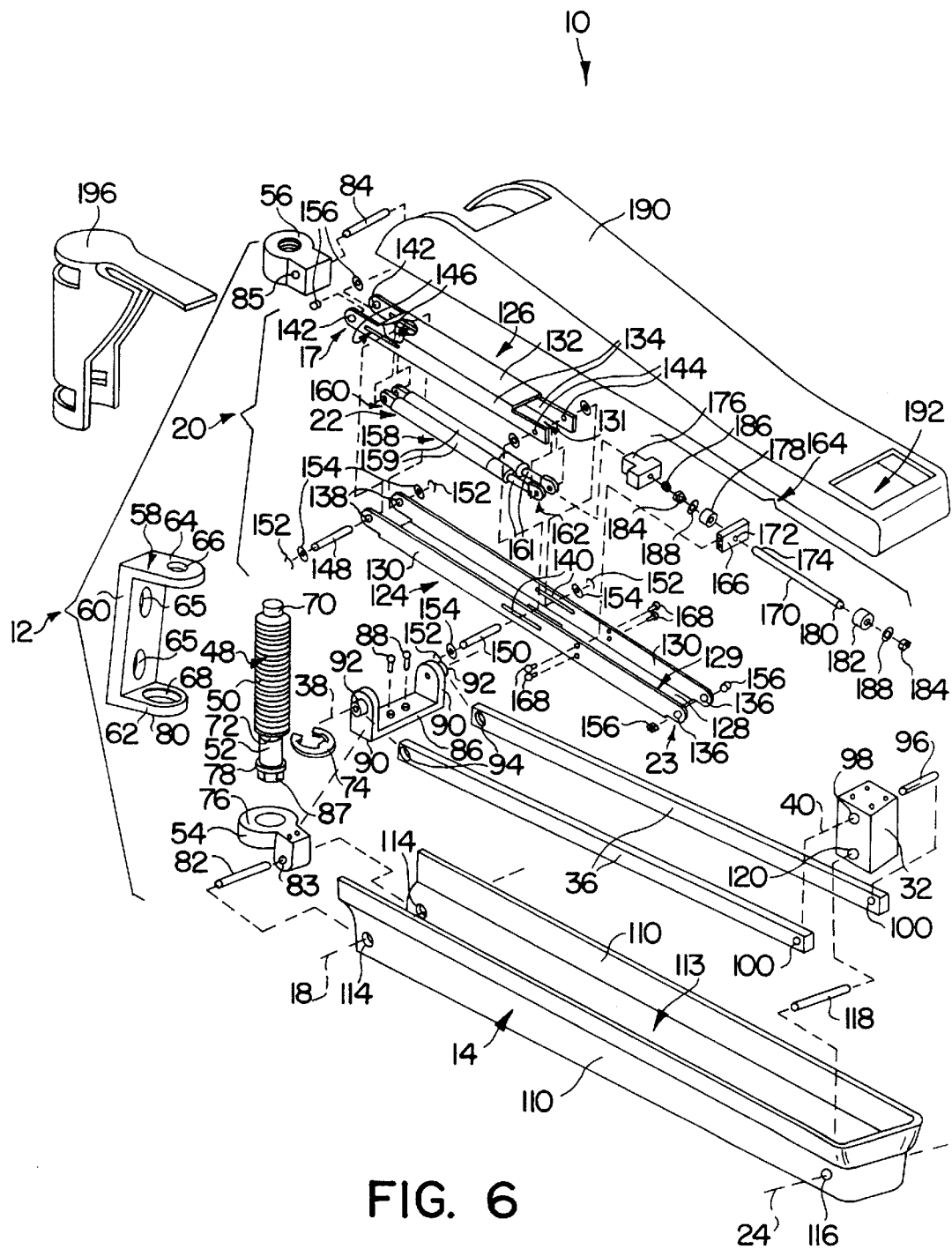
FIG. 6 is an exploded perspective view of the monitor arm of FIG. 1 showing the rigid arm pivotably mounted to a bottom collar of the mounting bracket assembly by a bottom collar pin, the counterbalancing assembly pivotably mounted to a top collar of the mounting bracket assembly by a top collar pin, the bottom collar connected to the top collar by a vertical adjustment screw of the mounting bracket assembly that can be rotated to adjust the spacing between the top and bottom collars, the pair of side-by-side gas springs positioned to lie beneath a top cover, beneath the second frame member, and above the first frame member, and each gas spring having a first end adjacent to the first end of the counterbalancing assembly slidably coupled to the second frame member and fixed to the first frame member and a second end slidably coupled to the first frame member and fixed to the second frame member so that sliding movement of the first frame member relative to the second frame member causes extension or retraction of the gas springs, the counterbalancing assembly including a stop assembly having a stop block fixed relative to the first frame member and a limit screw extending outwardly from the second end of the gas springs and slidably received by an aperture formed in the stop block, an upward limiter and a downward limiter fixed to the limit screw on either side of the stop block to limit the extent of the extension and retraction of the gas springs, thereby limiting the extent of the movement of the monitor arm, and the support block pivotably coupled to the second end of the rigid arm and to support links spaced apart from the rigid arm for supporting the monitor, the rigid arm cooperating with the support links to define a parallelogram structure so that the orientation of the support block and the monitor relative to the support structure is constant as the monitor arm pivots between the upward raised position and the downward lowered position.
Figure 7:
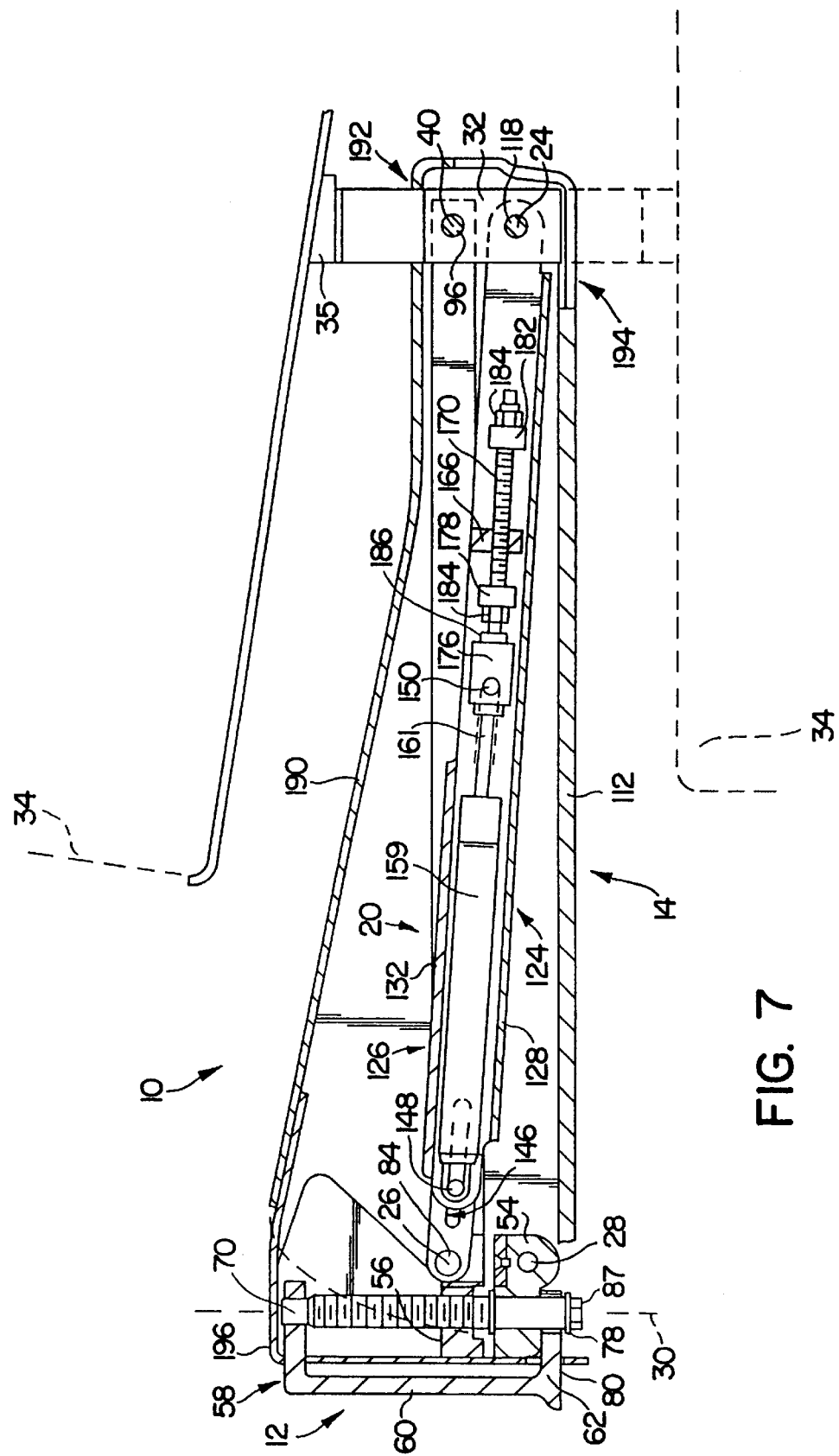
FIG. 7 is a sectional view taken along line 7—7 of FIG. 1 showing the rigid arm in a generally horizontal position, the adjustment screw adjusted so that the top collar engages the bottom collar, the support block at the second end of the rigid arm in an upwardly-extending orientation, a monitor (in phantom) supported by the upwardly-extending support block, and the support block (in phantom) in an alternative downwardly-extending orientation having the monitor attached to and hanging beneath the support block.

Monitor arm 10 also includes a vertically-extending support block 32 which is coupled to rigid arm 14 and counterbalancing assembly 20 for pivoting movement about second pivot axis 24 as shown best in FIGS. 1 and 6. An object 34 can be attached to support block 28 by an attachment frame 35 shown, for example, in FIG. 7, so that object 34 is supported by support block 32, rigid arm 14, and counterbalancing assembly 20 in spaced-apart relation from mounting bracket assembly 12 and wall 28 as shown in FIGS. 1 and 7.

While monitor arm 10 can support any object 34 of interest having a weight within limits dictated by counterbalancing assembly 20, it is anticipated that most users of monitor arm 10 will use monitor arm 10 to carry a monitor, for example, a cathode ray tube (CRT) monitor for computer equipment. Thus, the meaning of the word "monitor" or "monitor 34" as used in this specification and in the claims should be taken to include any object that is carried by monitor arm 10. Preferably, counterbalancing assembly 20 is selected so that monitor arm 10 supports monitor 34 weighing between twenty pounds and eighty pounds (9.1–36.3 kg).

Illustrative monitor arm 10 includes a pair of spaced-apart support links 36 extending from support block 32 to mounting bracket assembly 12. Support links 36 are coupled to support block 32 for pivoting movement about a generally horizontal fourth pivot axis 40 which is positioned to lie vertically above second pivot axis 24 as shown in FIGS. 7 and 8. In addition, support links 36 are coupled to mounting bracket assembly 12 for pivoting movement about a generally horizontal fifth pivot axis 38 which is positioned to lie vertically above first pivot axis 18 so that support links 36 are generally maintained in parallel relation with rigid arm 14 as rigid arm 14 is moved between the lowered position and the raised position.

Rigid arm 14 and support links 36 cooperate with mounting bracket assembly 12 and support block 32 to define a parallelogram mounting mechanism maintaining support block 32 in a generally vertical orientation as rigid arm 14 moves between the lowered position and the raised position. As a result, the center of gravity of monitor 34 is fixed relative to second pivot axis 24. Preferably, support block 32 and monitor 34 are positioned to lie so that the center of gravity of monitor 34 is above second pivot axis 24 when rigid arm 14 is in the raised position, the lowered position, and the positions therebetween. However, proper counterbalancing can be achieved without positioning the center of gravity of monitor 34 directly above second pivot axis 24 so long as the center of gravity of monitor 34 remains fixed relative to second pivot axis 24 during movement of rigid arm 14.

It will be understood by those skilled in the art that if monitor 34 were mounted to the rigid arm using a support that is fixed to the monitor arm, the center of gravity of the monitor would shift relative to the second pivot axis as the rigid arm pivots vertically relative to the wall. Instead, support block 32 is retained in a fixed orientation relative to wall 28 by the parallelogram mechanism defined by rigid arm 14, support block 32, support links 36, and mounting bracket assembly 12 so that the center of gravity of monitor 34 is fixed relative to second pivot axis 24.

While support block 32 and support links 36 cooperate with rigid arm 14 and mounting bracket assembly 12 to fix the position of the center of gravity of monitor 34 relative to second pivot axis 24, it is within the scope of the invention as presently perceived to employ other techniques to fix the center of gravity of monitor 34 relative to second pivot axis 24. For example, support block 32 could be oriented so that monitor 34 is mounted beneath monitor arm 10 and support block 32 freely pivots about second pivot axis 24 so that the center of gravity of monitor 34 is fixed relative to second pivot axis 24 when monitor arm 10 pivots between the raised position and the lowered position. Thus, the term "support means" as used in the specification and in the claims, encompasses all mechanical devices and assemblies that can be used to fix the center of gravity of monitor 34 relative to second pivot axis 24.

Figure 2:
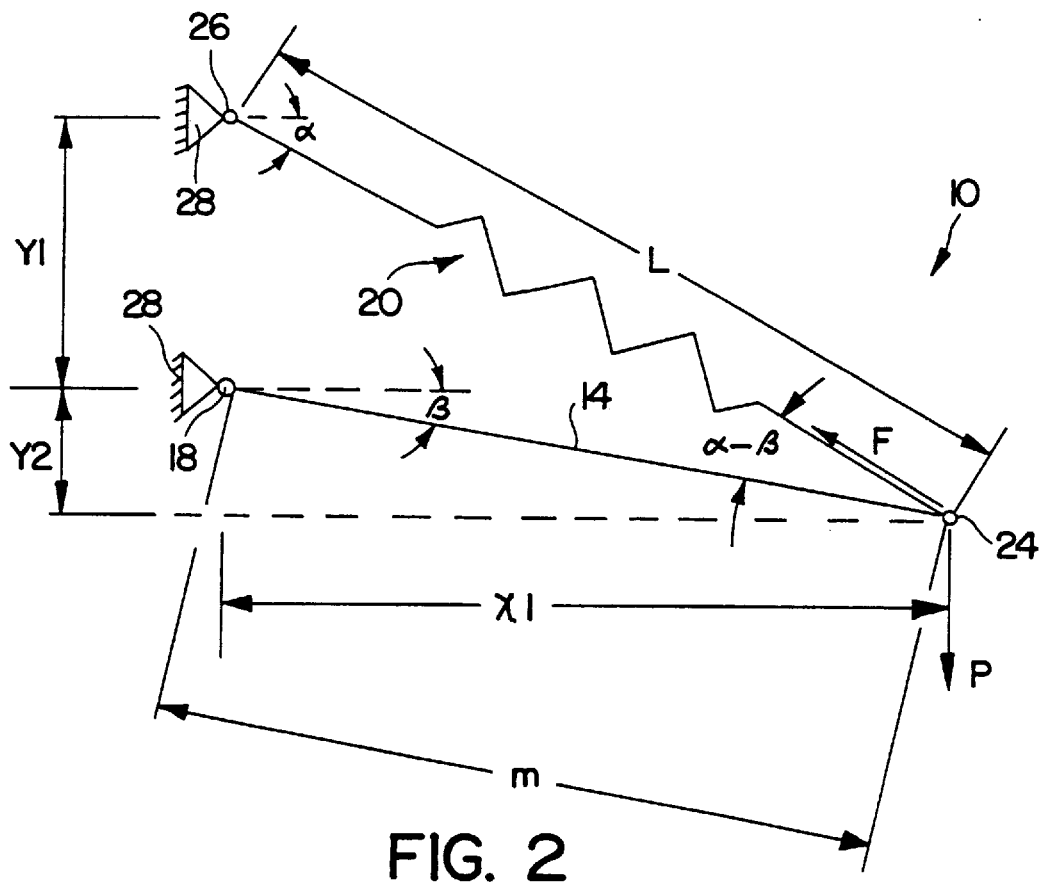
FIG. 2 is a diagrammatic view of the monitor arm of FIG. 1 showing the rigid arm pivotably coupled to the support structure for movement about the first pivot axis, the counterbalancing assembly pivotably coupled to the support structure for movement about the third pivot axis that is spaced apart from and positioned to lie above the first pivot axis, the second end of the counterbalancing assembly being coupled to the second end of the rigid arm, and arrows indicating the force acting on the monitor arm due to gravity and the force exerted by the counterbalancing assembly on the monitor arm.
Figure 3:
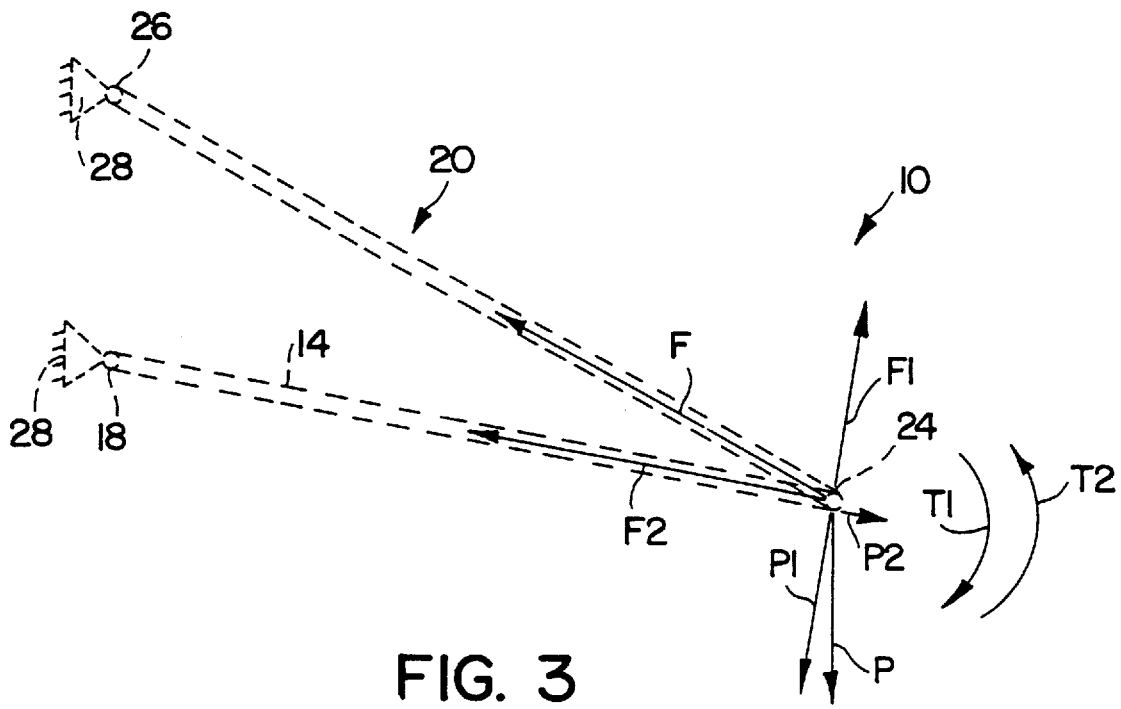
FIG. 3 is a diagrammatic view similar to FIG. 2 of the rigid arm and the counterbalancing assembly in the downward lowered position and showing an analysis of the forces acting on the monitor arm including a downward weight force created by the monitor supported by the monitor arm resolved into a downward force perpendicular to the rigid arm and a force parallel to the rigid arm and a counterbalancing force exerted by the counterbalancing assembly and resolved into a force parallel to the rigid arm and an upward force perpendicular to the rigid arm and equal to the downward perpendicular force acting on the rigid arm so that a weight torque created by the weight of the monitor arm and the weight of the monitor is opposed by an equal and opposite counterbalancing torque created by the counterbalancing assembly.

Counterbalancing assembly 20 includes a "linear force-providing element" 42 which creates a force F that pulls second end 22 of rigid arm 14 upwardly while pulling second end 23 of counterbalancing assembly 20 toward first end 17 of counterbalancing assembly 20 as shown in FIGS. 2 and 3. Specifically, linear force-providing element 42 pulls a lower swing pin 118 that defines second pivot axis 24 toward a top collar pin 84 that defines third pivot axis 26 as shown in FIG. 1.

Force F exerted by counterbalancing assembly 20 is linearly proportional to a distance L, shown in FIG. 2, separating lower swing pin 118 from top collar pin 84. As the distance between pins 118, 84 decreases, the magnitude of force F also decreases by an amount that is linearly proportional to the decrease of distance L. Thus, force F provided by linear force-providing element 42 is a linear force that varies linearly with changes in distance L.

Force F is directed from lower swing pin 118 toward top collar pin 84 as shown in FIGS. 2 and 3. Force F can be resolved into an upward component F1 of force F which is perpendicular to rigid arm 14 and a component F2 which is directed from lower swing pin 118 along rigid arm 14 toward first end 16. In addition, weight P of monitor 34 preferably extends downwardly from lower swing pin 118 as shown in FIGS. 2 and 3. Weight P is a force that can be resolved into a downward component P1 that is perpendicular to rigid arm 14 and a component P2 extending in a direction parallel to rigid arm 14 from lower swing pin 118 as shown in FIG. 3.

The mechanical advantage of weight P acting on counterbalancing assembly 20 can be adjusted by adjusting a distance Y1 between first pivot axis 18 and third pivot axis 26 as shown in FIG. 2. The adjustment of distance Y1 allows for adjusting the direction of force F relative to rigid arm 14 until component F1 of force F is generally equal to component P1 of weight P so that counterbalancing assembly 20 counterbalances the weight of monitor 34. Once component F1 is adjusted to counterbalance weight P, rigid arm 14 can be moved to a desired position selected from any of an infinite number of positions between the upward raised position and the downward lowered position and linear force-providing element 42 will automatically provide a component F1 of force F which counterbalances component P1 of weight P so that rigid arm 14 and monitor 34 will remain in the desired position. Thus, changes in the component P1 of weight P perpendicular to rigid arm 14 will be automatically compensated for by like changes in component F1 of force F that is perpendicular to rigid arm 14 and opposing component P1 of weight P.

Figure 4:
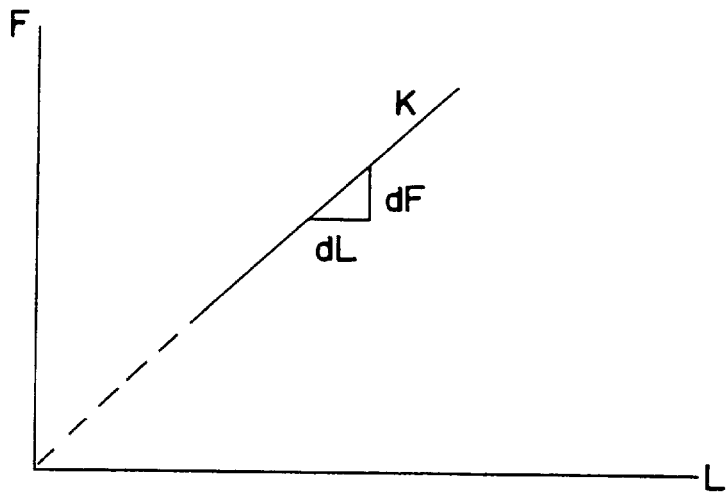
FIG. 4 is a graphical representation of the force exerted by the counterbalancing assembly of FIG. 1 at various lengths of the counterbalancing assembly showing that a linear force-providing element provides a force, the magnitude of which changes linearly with changes of the length of the counterbalancing assembly over the lengths of interest such that the curve graphically depicting the relationship between the force and the length of the counterbalancing assembly is linear and can theoretically be extended so that the intercept passes through the origin.

Linear force-providing element 42 has a spring constant K, defined as the ratio between a change in spring force dF and the accompanying change in length dL of the spring, which is essentially linear over the range of spring lengths of interest as shown graphically in FIG. 4. In other words, the force F versus distance L curve approximates a straight line over the range of motion of rigid arm 14. In addition, the intercept of the line passes through the origin. Thus, for linear force-providing element 42 to provide counterbalance for all positions of rigid arm 14 between the upward raised position and the downward lowered position, the following must hold true:

$$K = \frac{dF}{dL} \tag{1}$$

and $$K = \frac{F}{L} \tag{2}$$

Of course, if linear force-providing element 42 only approximates the above-described characteristics so that the magnitude of component F1 only approximately equals the magnitude of component P1 as rigid arm 14 moves between the raised position and the lowered position, monitor arm 10 can nevertheless be produced to vary only slightly from the above-described characteristics over the range of motion of interest so that the differences between F1 and P1 at various positions of monitor arm 10 between the raised position and the lowered position are small enough that the friction inherently present between moving parts of the assembly operate to overcome the differences between F1 and P1. Thus, counterbalance can still be achieved without the need to add locking devices, latching mechanisms, friction couplings, or other mechanisms to assist counterbalancing assembly 20.

As described above, rigid arm 14 is pivotably coupled to counterbalancing assembly 20 at second pivot axis 24 and a vertical distance Y1 separates first pivot axis 18 from third pivot axis 26 as shown in FIGS. 2 and 3. Thus, an angular displacement of counterbalancing assembly 20 from horizontal, denoted by an angle $\alpha$, and an angular displacement of rigid arm 14 from horizontal, denoted by angle $\beta$, shown in FIG. 2, are not equal. In addition, the angle between rigid arm 14 and counterbalancing assembly 20 has the value of $\alpha-\beta$ and is denoted as such in FIG. 2. Thus:

$$F1 = F\sin(\alpha-\beta) \quad (3)$$

and $$P1 = P\cos\beta \quad (4)$$

When counterbalancing assembly 20 counterbalances the weight P of monitor 34, the magnitude of component F1 is the same as the magnitude of component P1 so that:

$$F\sin(\alpha-\beta) = P\cos\beta \quad (5)$$

The following is a well known trigonometric identity:

$$F\sin(\alpha-\beta) = F\sin\alpha \times \cos\beta - F\cos\alpha \times \sin\beta \quad (6)$$

The identity can be substituted into equation (6) and equation (6) can be simplified to:

$$\left(\frac{F}{P}\right) \times (\sin\alpha - \cos\alpha \times \tan\beta) = 1 \quad (7)$$

However:

$$F = K \times L \quad (8)$$

$$\sin\alpha = \frac{Y1 + Y2}{L} \quad (9)$$

$$\cos\alpha = \frac{X1}{L} \quad (10)$$

and $$\tan\beta = \frac{Y2}{X1} \quad (11)$$

where

Y2 = a vertical distance between first pivot axis 18 and second pivot axis 24;

X1 = a horizontal distance between first pivot axis 18 and second pivot axis 24;

so that after substitution, equation (5) can be rewritten as:

$$\left[\left(\frac{K \times L}{P}\right) \times \left(\frac{Y1 + Y2}{L}\right)\right] - \left[\left(\frac{X1}{L}\right) \times \left(\frac{Y2}{X1}\right)\right] = 1 \quad (12)$$

Equation (12) can be simplified to:

$$\left[\left(\frac{KL}{P}\right)\left(\frac{Y1}{L}\right)\right] = 1 \quad (13)$$

which can be simplified even further to:

$$(K)(Y1) = P \quad (14)$$

Thus, since P and K are constant, equation (14) suggests that the distance Y1 between first pivot axis 18 and third pivot axis 26 can be adjusted to a distance at which weight P is counterbalanced by force F of counterbalancing assembly 20. It will be clear to those skilled in the art that changing Y1 changes the mechanical advantage of weight P on counterbalancing assembly 20. It will also be clear that changing Y1 changes $\alpha-\beta$ thereby changing F1 as shown by equation (3). In addition, changing Y1 will have a slight effect on distance L, and thus on F and F1, however the change in F1 due to the change in L is small compared to the change in F1 due to the change in Y1.

The magnitude of a weight torque T1 can be determined mathematically using the following equation:

$$T1 = m \times P1 \quad (15)$$

where m = a distance between first pivot axis 18 and the point on rigid arm where the weight of monitor 34 acts on the rigid arm.

A counterbalancing torque T2 has a magnitude that is equal to T1 when the weight of monitor 34 is counterbalanced by counterbalancing assembly. The magnitude of T2 can be determined mathematically using the following equation:

$$T2 = m \times F1 \quad (16)$$

where m = a distance between first pivot axis 18 and the point on rigid arm where the force of counterbalancing assembly 20 acts on the rigid arm.

Thus, counterbalancing assembly 20 of monitor arm 10 can be adjusted so that T1=T2 by adjusting distance Y1 separating third pivot axis 26 from first pivot axis 18 allowing monitor arm 10 to provide a force F to counterbalance the weight of monitor 34. As described above, the magnitude of force F varies linearly with the change in distance between the ends of counterbalancing assembly 20 so that T1=T2 independent of placement of rigid arm 14 in the raised position, the lowered position, or any position therebetween.

Figure 5:
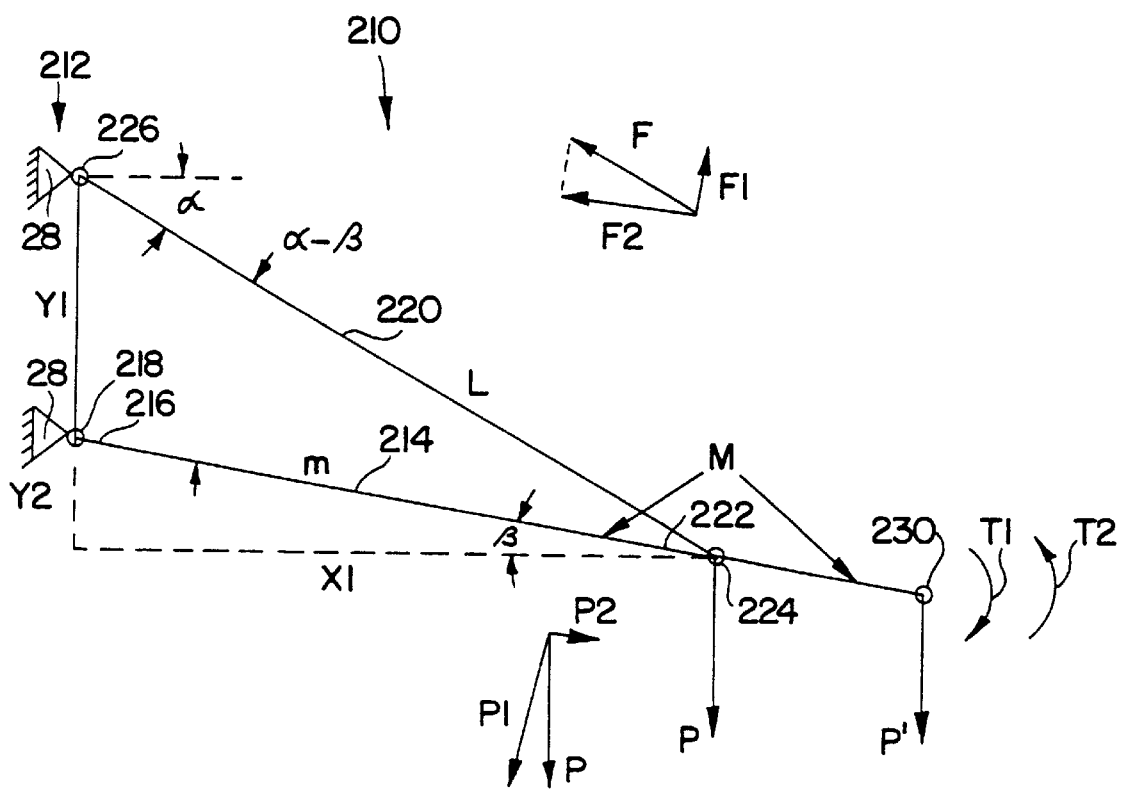
FIG. 5 is a diagrammatic view of a second embodiment of a monitor arm in accordance with the present invention showing a rigid arm having a first end pivotably coupled to the support structure for movement about a first pivot axis and a second end spaced apart from the first end, a counterbalancing assembly having a first end pivotably coupled to the support structure for movement about a second pivot axis that is spaced apart from and positioned to lie above the first pivot axis, the counterbalancing assembly having a second end coupled to the rigid arm at a coupling that is spaced apart from each of the first and second ends of the rigid arm, the coupling being infinitely positionable along the rigid arm to adjust the force exerted by the counterbalancing assembly on the rigid arm to counterbalance the weight of the monitor arm and a variety of monitors that can be carried by the monitor arm.

A diagrammatic view of a second embodiment of a monitor arm 210 in accordance with the present invention is shown in FIG. 5. Monitor arm 210 includes a mounting bracket assembly 212 which is mountable to wall 28, a rigid arm 214 having a first end 216 mounted to mounting bracket assembly 212 for pivoting movement about a first pivot axis 218, and a counterbalancing assembly 220 mounted to a second end 222 of rigid arm 214 for pivoting movement about a second pivot axis 224. Counterbalancing assembly 220 extends from rigid arm 214 and connects to mounting bracket assembly 212 for pivoting movement about a third pivot axis 226. Preferred third pivot axis is positioned to lie vertically above first pivot axis 218.

Monitor arm 10 also includes support means (not shown) for supporting monitor 34 or other objects (not shown) so that a center of gravity of monitor 34 is fixed relative to a fourth pivot axis 230 as rigid arm 214 is moved between an upward raised position and a downward lowered position. Because the center of gravity of monitor 34 is fixed relative to fourth pivot axis 230, a weight P' of monitor 34, shown in FIG. 5, acts downwardly through fourth pivot axis 230 independent of placement of rigid arm 214 in the upward raised position, the downward lowered position, or any position therebetween. Weight P' creates a virtual weight P which acts downwardly through second pivot axis 224, as shown in FIG. 8. Weight P'=RP, where R is the ratio of a distance m that separates first pivot axis 218 from second pivot axis 224 to a distance N that separates first pivot axis 218 from fourth pivot axis 230.

Counterbalancing assembly 220 creates a force F that acts at second pivot axis 224 and is directed toward third pivot axis 226. Preferred force F is linearly proportional to a distance L, shown in FIG. 5, that separates second pivot axis 224 from third pivot axis 226. By adjusting distance m that separates first pivot axis 218 from second pivot axis 224, force F can be adjusted until a component F1 of force F, which is generally upwardly-directed and perpendicular to rigid arm 214, is essentially equal in magnitude and opposite in direction to a component P1 of virtual weight P, which is generally downwardly-directed and perpendicular to rigid arm 214, as shown in FIG. 5. Once component F1 is adjusted to counterbalance virtual weight P, rigid arm 214 can be moved to any of an infinite number of positions between the upward raised position and the downward lowered position and, upon release, rigid arm 214 and monitor 34 will automatically remain stationary.

Counterbalancing assembly 220 has a spring constant K which is well known to those skilled in the art as the ratio of a change in counterbalancing force dF to a change in distance dL. A representative force F versus distance L requirement for counterbalancing assembly 220 to provide counterbalance for all positions of rigid arm 214 between the upward raised position and the downward lowered position is shown graphically in FIG. 4. The force F versus distance L curve must approximately be a straight line over the range of motion or rigid arm 214 and the slope of the force F versus distance L curve must essentially pass through the origin. Thus, counterbalancing assembly 220 provides counterbalance for all positions of rigid arm 14 between the upward raised position and the downward lowered position.

For counterbalancing assembly 220, equation (14) can be rewritten as:

$$(K) \times (Y1) \times \left( \frac{m}{M} \right) = P' \qquad (17)$$

so that the distance m governs whether or not weight P' is counterbalanced by counterbalancing assembly 220 because P', X, Y1 and X are fixed quantities.

As previously described, with reference to the first embodiment monitor arm 10 rigid arm 14 and counterbalancing assembly 20 are both pivotably coupled to mounting bracket assembly 12. Mounting bracket assembly 12 of preferred and illustrative monitor arm 10 includes an adjustment screw 48 having a threaded portion 50 and a lower journal portion 52, a bottom collar 54 mounted to lower journal portion 52, and a top collar 56 threadingly mounted to threaded portion 50 for vertical adjustment, as shown in FIGS. 6–8. Mounting bracket assembly 12 also includes a C-shaped pivot mount 58 having a back plate 60, a horizontal bottom plate 62 extending outwardly from a bottom portion of back plate 60, and a horizontal top plate 64 extending outwardly from a top portion of back plate 60 above bottom plate 62.

Back plate 60 is formed to include a pair of spaced-apart apertures 65 which receive screws 61, shown in FIG. 1, so that monitor arm 10 can be mounted to wall 28. Top plate 64 is formed to an include an aperture 66 and bottom plate 62 is formed to include an aperture 68 which is positioned to lie directly beneath aperture 66. An upper journal portion 70 of adjustment screw 48 is received by aperture 66 and lower journal portion 52 is received by aperture 68 so that adjustment screw 48 is mounted to pivot mount 58 for rotation about vertical pivot axis 30, as shown in FIGS. 1 and 6–8.

Adjustment screw 48 is formed to include a groove 72 which receives a retaining ring 74. Groove 72 and retaining ring 74 are positioned to lie above bottom collar 54 so that retaining ring 74 engages a top surface 76 of bottom collar 54 preventing adjustment screw 48 from moving downwardly relative to pivot mount 58. In addition, adjustment screw 48 is formed to include a lip 78 that engages a bottom surface 80 of bottom plate 62 so that adjustment screw 48 is prevented from moving upwardly relative to pivot mount 58. Thus, adjustment screw 48 is constrained from vertical movement by retaining ring 74 and lip 78.

Rigid arm 14 is pivotably mounted to bottom collar 54 for pivoting movement about first pivot axis 18 by a bottom collar pin 82 which is received by an aperture 83 formed in bottom collar 54, as shown in FIG. 6. Similarly, counterbalancing assembly 20 is pivotably mounted to top collar 56 for pivoting movement about third pivot axis 26 by top collar pin 84 which is received by an aperture 85 formed in top collar 56. When rigid arm 14 and counterbalancing assembly 20 pivot about vertical pivot axis 30, top and bottom collars 56, 54 cause adjustment screw 48 to rotate about vertical pivot axis 30 so that upper journal portion 70 rotates in aperture 66 and lower journal portion 52 rotates in aperture 68.

When rigid arm 14 is prevented from pivoting about vertical pivot axis 30, a bolt-head portion 87 of adjustment screw 48 can be engaged to rotate adjustment screw 48 about vertical pivot axis 30 so that top collar 56 either moves downwardly toward bottom collar 54 or upwardly away from bottom collar 54. Movement of top collar 56 relative to bottom collar 54 changes distance Y1 by causing third pivot axis 26 to move relative to first pivot axis 18. Thus, force F provided by counterbalancing assembly 20 can be adjusted to counterbalance weight P by turning adjustment screw 48.

Mounting bracket assembly 12 also includes a U-shaped flange 86 which is rigidly mounted to bottom collar 54 by a pair of screws 88, as shown best in FIG. 6. Flange 86 includes a pair of spaced-apart upwardly-extending portions 90 and an outwardly-extending journal 92 is appended to each upwardly-extending portion 90. Each support link 36 is formed to include an aperture 94 which receives a corresponding journal 92 so that support links 36 are mounted to flange 86 for pivoting movement about fifth pivot axis 38. Journals 92 are positioned to lie vertically above bottom collar pin 82, as shown best in FIG. 8.

Support links 36 extend from journals 92 and are pivotably coupled to support block 32 by an upper swing pin 96, as shown in FIG. 6. Upper swing pin 96 is received by an aperture 98 formed in support block 32 and by an aperture 100 formed in each of support links 36 so that support links 36 are coupled to support block 32 for pivoting movement about fourth pivot axis 40.

Rigid arm 14 includes a bottom wall 112 and sidewalls 110 extending generally upwardly from bottom wall 112 to define a channel 113 having a generally U-shaped cross-section, as shown in FIG. 6. Support block 32 is positioned to lie within channel 113 between sidewalls 110 and adjacent to second end 22 of rigid arm 14. Support links 36 are also positioned to lie between sidewalls 110. Each sidewall 110 is formed to include an aperture 114 adjacent to first end 16 of rigid arm 14 and an aperture 116 adjacent to second end 22 of rigid arm 14. Bottom collar pin 82 is received by apertures 114 so that rigid arm is pivotably coupled to bottom collar 54 and a lower swing pin 118 is received by apertures 116 and by an aperture 120 formed in support block 32 vertically beneath aperture 98. Thus, support block 32 is pivotably coupled to rigid arm 14 for pivoting movement about second pivot axis 24 by lower swing pin 118.

Counterbalancing assembly is also coupled to lower swing pin 118 for pivoting movement about second pivot axis 24. Counterbalancing assembly 20 extends from lower swing pin 118 and couples to top collar 56 for pivoting movement about third pivot axis 26 by top collar pin 84. First, third, and fifth pivot axes 18, 26, 40 are vertically aligned, as are second and fourth pivot axes 24, 38, as shown in FIG. 8. In addition, support links 36 straddle counterbalancing assembly 20 as shown in FIGS. 1 and 6.

Preferred and illustrative counterbalancing assembly 20 includes a first frame member 124 and a second frame member 126 which is slidably coupled to and overlaps first frame member 124 in an in-line arrangement, as shown in FIGS. 1 and 6. First frame member 124 includes a bottom plate 128 and spaced-apart side rails 130 extending generally upwardly from bottom plate 128 so that first frame member 124 has a U-shaped cross-section forming a channel 129. Similarly, second frame member 126 includes a top plate 132 and spaced-apart side rails 134 extending generally downwardly from top plate 132 so that second frame member 126 has a U-shaped cross-section forming a channel 131.

Bottom plate 128 is slightly wider than top plate 132 allowing first and second frame members 124, 126 to mate together so that portions of side rails 134 of second frame member 126 are positioned to lie inside channel 129 formed by side rails 130 and bottom plate 128 of first frame member 124, as shown in FIGS. 1 and 6. Side rails 130 of first frame member 124 are each formed to include a first aperture 136, a second aperture 138, and a slot 140 which is positioned to lie between first and second apertures 136, 138. Similarly, side rails 134 of second frame member 126 are each formed to include a first aperture 142, a second aperture 144, and a slot 146 which is positioned to lie between first and second apertures 142, 144.

First and second frame members 124, 126 are slidably coupled to one another by a first pin 148 and a second pin 150 as shown in FIG. 6. First pin 148 is received by apertures 138 of first frame member 124 and is received by slot 146 of second frame member 126. Second pin 150 is received by apertures 144 of second frame member 126 and is received by slot 140 of first frame member 124. A washer 154 is mounted on each end of first and second pins 148, 150 and a C-ring 152 holds first and second pins 148, 150 in place.

In addition, apertures 136 of first frame member 124 receive lower swing pin 118 so that first frame member 124 is pivotably coupled to rigid arm 14 for pivoting movement about second pivot axis 24. Similarly, apertures 142 of second frame member 126 receive top collar pin 84 so that second frame member 126 is pivotably coupled to top collar 56 for pivoting movement about third pivot axis 26. A bushing 156 is mounted on each end of top collar pin 84 and lower swing pin 118 so that friction forces are minimized.

When rigid arm 14 pivots downwardly about first pivot axis 18, first and second frame members 124, 126 elongate causing first pin 148 and second pin 150 to slide toward one another in slot 146 and slot 140, respectively. When rigid arm 14 pivots upwardly about first pivot axis 18, first and second frame members 124, 126 contract causing first pin 148 and second pin 150 to slide away from one another in slot 146 and slot 140, respectively.

Linear force-providing element 42 of preferred and illustrative monitor arm 10 includes a pair of side-by-side gas springs 158. Each gas spring 158 includes a cylinder 159 having an end 160 coupled to first pin 148 and a piston 161 having an end 162 coupled to second pin 150. Thus, when rigid arm 14 pivots upwardly about first pivot axis 18, contracting first and second frame members 124, 126 and sliding first and second pins 148, 150 away from one another, piston 161 slides within cylinder 159 so that gas springs 158 elongate. When rigid arm 14 pivots downwardly about first pivot axis 18, elongating first and second frame members 124, 126 sliding first and second pins 148, 150 toward one another, piston 161 slides within cylinder 159 so that gas springs 158 contract.

Gas springs 158 provide force F which counterbalances monitor 34. Gas springs 158 are preferably installed so that gas springs 158 are in compression at each position of monitor arm 10 between the raised position and the lowered position so that force F yieldably biases first and second pins 148, 150 away from one another. Since first and second pins 148, 150 are coupled to first and second frame members 124, 126, force F of gas springs 158 places counterbalancing assembly 20 in tension to yieldably bias first and second frame members 124, 126 together. As a result, force F urges counterbalancing assembly 20 to pivot upwardly about third pivot axis 26 relative to mounting bracket assembly 12 while simultaneously urging rigid arm 14 to pivot upwardly about first pivot axis 18 relative to mounting bracket assembly 12.

In order to maintain counterbalance as rigid arm 14 moves between the lowered position and the raised position, gas springs 158 include pressurized gas in an interior region (not shown) of cylinder 159 so that force F provided by gas springs 158 is linearly proportional to distance L that separates second and third pivot axes 24, 26. As gas springs 158 contract and elongate, force F changes magnitude and direction so that monitor 34 remains counterbalanced independent of the position of rigid arm 14 between the downward lowered position and the upward raised position. Preferred gas springs 158 are model number 4971EE0800N gas springs made by Stabilus located in Colmar, Pa.

Preferred and illustrative monitor arm 10 also includes a stop assembly 164 that can be adjusted to limit the range of motion through which rigid arm 14 can pivot about first pivot axis 18. Stop assembly 164 includes a stop block 166 attached to first frame member 124 by a plurality of screws 168. A limit screw 170 extends through an aperture 172 formed in stop block 166 for sliding movement relative to stop block 166. A first end 174 of limit screw 170 is rigidly mounted to a spring block 176 which is coupled to second frame member 126 by second pin 150 as shown in FIGS. 1 and 6. A locking nut 186 is mounted on limit screw 170 and is tightened against spring block 176 to lock limit screw 170 relative to spring block 176.

An upward limiter 178 is mounted on limit screw 170 between stop block 166 and spring block 176. A second end 180 of limit screw 170 is positioned to lie between stop block 166 and second pivot axis 24. A downward limiter 182 is mounted on limit screw 170 between stop block 166 and second end 180 of limit screw 170. An adjustment nut 184 is threadingly mounted on limit screw 170 adjacent to each of upward and downward limiters 178, 182 and a washer 188 separates each adjustment nut 184 from the respective upward and downward limiter 178, 182.

Each adjustment nut 184 can be rotated to move the corresponding upward and downward limiter 178, 182 toward stop block 166 or away from stop block 166 as desired. When upward limiter 178 engages stop block 166, rigid arm 14 is prevented from further upward pivoting movement and when downward limiter 182 engages stop block 166, rigid arm 14 is prevented from further downward pivoting movement, as illustratively shown in FIG. 8. Upward and downward limiters 178, 182 can be made from an elastomer material, a rubber material, or any other material that cushions the feel of monitor arm 10 when limiters 178, 182 engage stop block 166. When upward limiter 178 and downward limiter 182 are adjusted to a fully-spaced apart configuration, as shown in FIG. 7, illustrative and preferred rigid arm 14 has a range of motion of 15° (degrees) above horizontal to 15° (degrees) below horizontal.

Monitor arm 10 further includes an upper housing 190 that attaches to sidewalls 110 of rigid arm 14 as shown in FIGS. 6–8. Upper housing 190 covers counterbalancing assembly 20 and support link 36 so that objects cannot be inadvertently inserted between rigid arm 14 and counterbalancing assembly 20. Upper cover 190 is formed to include a square-shaped aperture 192. Aperture 192 allows access to support block 32 so that monitor 34 can be attached to support block 32. In an alternative embodiment of monitor arm 10, upper housing 190 is not formed to include aperture 192 and rigid arm 14 is formed to include an aperture 194 that allows monitor 34 to be mounted to support block 32 so that monitor 34 is positioned to lie below rigid arm 14, as shown in FIG. 7 (in phantom). Monitor arm 10 also includes a mounting bracket cover 196 that mounts to pivot mount 58 and shields adjustment screw 48, bottom collar 54, and top collar 56 from view.

Although the invention has been described in detail with reference to certain preferred embodiments, variations and modifications exist within the scope and spirit of the invention as described and as defined in the following claims.

We claim:

1. An arm mechanism for supporting an object relative to a support structure, the arm mechanism comprising:

a mounting assembly adapted to be coupled to the support structure, a first arm having a first end pivotably coupled to the mounting assembly for pivoting movement about a generally horizontal first pivot axis between a lowered position and a raised position, support member coupled to the first arm for pivoting movement about a generally horizontal second pivot axis that is spaced from the first pivot axis, the support member being adapted to be coupled to the object, a second arm coupled to the mounting assembly for pivoting movement about a generally horizontal fifth pivot axis that is vertically spaced from the first pivot axis, the second arm being coupled to the support member for pivoting movement about a generally horizontal fourth pivot axis that is vertically spaced from the second pivot axis, and a counterbalancer configured to counterbalance the weight of the object and the weight of the arm mechanism so that the first arm automatically remains stationary upon placement of the first arm in a desired position between the raised position and the lowered position, the counterbalancer being pivotably coupled to the mounting assembly for pivoting movement about a third pivot axis that is vertically spaced from the first and fifth pivot axes and that is continuously vertically aligned with and above the first and fifth pivot axes, the counterbalancer being pivotably coupled to the first arm for pivoting movement about the second pivot axis, the counterbalancer including a force-providing element inclined with respect to the first arm and inclined with respect to the second arm.

2. The arm mechanism of claim 1, wherein the counterbalancer includes a first member pivotable about the second pivot axis and a second member slidably coupled to the first member and pivotable about the third pivot axis, and the force-providing element includes a gas spring having a piston coupled to one of the first and second members and having a cylinder coupled to the other of the first and second members.

3. The arm mechanism of claim 2, wherein the first member and the second member are held together in an in-line arrangement for sliding movement by a first pin and a second pin, and the piston of the gas spring is coupled to one of the first and second pins and the cylinder of the gas spring is coupled the other of the first and second pins so that the gas spring contracts when the first and second members move away from one another and the gas spring elongates when the first and second members move towards one another.

4. The arm mechanism of claim 1, wherein the third pivot axis is vertically movable relative to the first and fifth pivot axes to adjust a force created by the force-providing element.

5. The arm mechanism of claim 4, wherein the mounting assembly includes a bracket adapted to couple to the support structure, a vertically-extending adjustment screw rotatably connected to the bracket, a first collar mounted on the adjustment screw, and a second collar mounted on the adjustment screw above the first collar, rotation of the adjustment screw vertically moves the second collar relative to the first collar, the first arm is pivotably connected to the first collar and the counterbalancer is pivotably connected to the second collar so that rotating the adjustment screw adjusts a position of the counterbalancer relative to the first arm.

6. The arm mechanism of claim 1, wherein the third pivot axis is positioned to lie generally vertically above the first and fifth pivot axes.

7. The arm mechanism of claim 1, further comprising a stop assembly that limits movement of the first arm about the first pivot axis, the stop assembly being mounted to the counterbalancer and including a first limit member spaced from the second pivot axis and a second limit member spaced from the third pivot axis and contact between the first and second limit members prevents movement of the first arm about the first pivot axis.

8. The arm mechanism of claim 7, wherein the counterbalancer includes a first member pivotable about the second horizonal pivot axis and a second member slidably mounted to the first member and pivotable about the third pivot axis, the first limit member of the stop assembly includes a stop block fixed to the first member and formed to include an aperture, the second limit member of the stop assembly includes a limit screw mounted to the second member and extending through the aperture and a limiter mounted on the limit screw to engage the stop block to limit a sliding movement of the first member relative to the second member, thereby limiting the pivoting movement of the first arm.

9. The arm mechanism of claim 1, wherein the counterbalancer is configured to provide an upward counterbalance force that ranges from twenty pounds to eighty pounds.

10. The arm mechanism of claim 1, wherein the counterbalancer includes a first member pivotable about the second pivot axis, a second member pivotable about the third pivot axis, and a pair of pins that couple the first member to the second member for sliding movement of the first member relative to the second member and the force-providing element is coupled to the pair of pins.

11. The arm mechanism of claim 10, wherein the first member is formed to include a first slot, the second member is formed to include a second slot, a first of the pair of pins is fixed to the second member and is received in the first slot, and a second of the pair of pins is fixed to the first member and is received in the second slot.

12. The arm mechanism of claim 1, wherein each of the first arm, the second arm, and the counterbalancer are coupled to the mounting assembly for pivoting movement about a vertical pivot axis.

13. The arm mechanism of claim 12, herein the mounting assembly includes a mounting bracket and a vertical member coupled to the mounting bracket for pivoting movement about the vertical pivot axis and each of the first arm, the second arm, and the counterbalancer are coupled to the vertical member to pivot therewith about the vertical pivot axis.

14. An arm mechanism for supporting an object relative to a support structure, the arm mechanism comprising:

a mounting assembly adapted to be coupled to the support structure, a first arm having a first end pivotably coupled to the mounting assembly so that the first arm pivots about a generally horizontal first pivot axis between a lowered position and a raised position and so that the first arm is positionable in an infinite number of positions about the first pivot axis between the raised and lowered positions, the first arm having a second end spaced from the first end, a support member coupled to the second end of the first arm for pivoting movement about a generally horizontal second pivot axis, the support member being adapted to be coupled to the object, a second arm having a first end coupled to the mounting assembly for pivoting movement about a generally horizontal fifth pivot axis that is vertically spaced from the first pivot axis, the second arm having a second end coupled to the support member for pivoting movement about a generally horizontal fourth pivot axis that is vertically spaced from the second pivot axis, and a counterbalancer having a first end pivotably coupled to the mounting assembly for pivoting movement about a third pivot axis that is continuously vertically above and vertically aligned with the first and fifth pivot axes, the counterbalancer having a second end pivotably coupled to the first arm, the counterbalancer being configured to exert a force on the first arm opposing the weight of the object, the first end of the counterbalancer being vertically movable relative to the first end of the first arm so that the third pivot axis is vertically movable relative to the first and third pivot axes while remaining vertically aligned with the first and fifth pivot axes to adjust the force exerted on the first arm by the counterbalancer.

15. The arm mechanism of claim 14, wherein the counterbalancer includes a first member coupled to the first arm for pivoting movement about a member pivot axis, a second member coupled to the mounting assembly for pivoting movement about the third pivot axis, and a linear force-providing element coupled to the first member and coupled to the second member, the linear force-providing element providing the force in an amount which is linearly proportional to a distance between the member pivot axis and the third pivot axis.

16. The arm mechanism of claim 15, wherein the member pivot axis is coincident with the second pivot axis.

17. The arm mechanism of claim 14, wherein the mounting assembly includes a bracket having a back plate adapted to be mounted to the support structure, a top plate extending generally horizontally from a top portion of the back plate, a bottom plate spaced from the top plate extending generally horizontally from a bottom portion of the back plate, a vertically-extending adjustment screw rotatably coupled to the top and bottom plates, a first collar mounted on the adjustment screw, a second collar mounted on the adjustment screw and spaced from the first collar, rotation of the adjustment screw vertically moves the second collar relative to the first collar, and the first arm being coupled to the first collar for pivoting movement about the first pivot axis and the counterbalancer being coupled to the second collar for pivoting movement about the third pivot axis so that rotation of the adjustment screw moves the third pivot axis relative to the first and fifth pivot axes.

18. The arm mechanism of claim 14, wherein the counterbalancer is coupled to the first arm for pivoting movement about the second pivot axis.

19. The arm mechanism of claim 14, wherein each of the first arm, the second arm, and the counterbalancer are coupled to the mounting assembly for pivoting movement about a vertical pivot axis.

20. An arm mechanism for supporting an object relative to a support structure, the arm mechanism comprising:

a mounting assembly adapted to be coupled to the support structure, a first arm pivotably coupled to the mounting assembly to pivot about a generally horizontal first pivot axis between a lowered position and a raised position, the first arm being angularly positionable in an infinite number of positions between the lowered position and the raised position, a support member coupled to the first arm for pivoting movement about a generally horizontal second pivot axis that is spaced from the first pivot axis, the support member being adapted to be coupled to the object, a second arm coupled to the mounting assembly for pivoting movement about a generally horizontal fifth pivot axis that is vertically spaced from the first pivot axis, the second arm being coupled to the support member for pivoting movement about a generally horizontal fourth pivot axis that is vertically spaced from the second pivot axis, and a counterbalancer having a first end coupled to the mounting assembly for pivoting movement about a third pivot axis that is continuously vertically above and vertically aligned with the first and fifth axes, the counterbalancer having a second end coupled to the first arm for pivoting movement about the second pivot axis, the counterbalancer being configured to exert a force on the first arm and the first end of the counterbalancer being vertically movable relative to the first arm so that the third pivot axis is vertically movable relative to the first and fifth pivot axes while remaining vertically aligned with the first and fifth pivot axes to adjust the force exerted on the first arm by the counterbalancer.

21. The arm mechanism of claim 20, wherein each of the first arm, the second arm, and the counterbalancer are coupled to the mounting assembly for pivoting movement about a vertical pivot axis.

22. An apparatus for supporting an object relative to a structure, the apparatus comprising:

a mount adapted to be coupled to the structure, a parallelogram mechanism including an arm, a link spaced from the arm, and a support member adapted to be coupled to the object, the arm being pivotably coupled to the mount at a first pivot point and pivotably coupled to the support member at a second pivot point spaced from the first pivot point, the link being pivotably coupled to the mount at a fifth pivot point and pivotably coupled to the support member at a fourth pivot point, the first pivot point being vertically spaced from the fifth pivot point and the second pivot point being vertically spaced from the fourth pivot point, and a counterbalancer coupled to the mount at a third pivot point that is continuously vertically spaced above and vertically aligned with both of the first pivot point and the fifth pivot point, the counterbalancer being coupled to the support member at a pivot point that is vertically spaced from and vertically aligned with at least one of the second pivot point and the fourth pivot point, the counterbalancer exerting a force on the parallelogram mechanism so that the parallelogram mechanism remains stationary upon placement in a desired position, and the third pivot point moves vertically relative to the first and fifth pivot points to adjust the force exerted on the parallelogram mechanism by the counterbalancer.

23. The apparatus of claim 22, wherein the counterbalancer includes a first member pivotable about the second pivot point, a second member slidably coupled to the first member and pivotable about the third pivot point, and a gas spring having a first end coupled to the first member and a second end coupled to the second member, the first and second ends of the gas spring being positioned to lie between the second and third pivot points.

24. The apparatus of claim 22, wherein the mount includes a bracket adapted to be coupled to the structure, a vertical adjustment screw rotatably connected to the bracket, a first collar mounted on the adjustment screw, and a second collar mounted on the adjustment screw above the first collar, rotation of the adjustment screw vertically moves the second collar relative to the first collar, the arm is pivotably coupled to the first collar, and the counterbalancer is pivotably coupled to the second collar so that rotation of the adjustment screw adjusts a position of the counterbalancer relative to the arm.

25. The apparatus of claim 22, further comprising a stop assembly that limits movement of the arm about the first pivot point, the stop assembly being mounted to the counterbalancer and includes a first limit member spaced from the second pivot point and a second limit member spaced from the third pivot point and contact between the first and second limit members prevents movement of the arm about the first pivot point.

26. The apparatus of claim 22, wherein each of the arm, the link, and the counterbalancer are coupled to the mount for pivoting movement about a vertical pivot axis.

27. The apparatus of claim 22, wherein the arm is formed to include a channel, the link is positioned to lie in the channel, and a portion of the counterbalancer is positioned to lie in the channel.

28. An apparatus for supporting an object relative to a support structure, the arm mechanism comprising:
    a mount adapted to be coupled to the support structure,
    an arm pivotably coupled to the mount to pivot about a first pivot point between a lowered position and a raised position, the arm being angularly positionable in an infinite number of positions between the lowered position and the raised position,
    a support member coupled to the arm for pivoting movement about a second pivot point that is spaced from the first pivot point, the support member being adapted to be coupled to the object, and
    a counterbalancer coupled to the mount for pivoting movement about a third pivot point that is vertically spaced from and vertically aligned with the first pivot point, the counterbalancer being coupled to the arm for pivoting movement about the second pivot point, the counterbalancer being configured to exert a force on the first arm, and the third pivot point moves vertically relative to the first pivot point while remaining vertically aligned with the first pivot point to adjust the force exerted on the arm by the counterbalancer wherein the mount includes a bracket adapted to be coupled to the support structure, a vertical adjustment screw rotatably connected to the bracket, a first collar mounted on the adjustment screw, and a second collar mounted on the adjustment screw above the first collar, rotation of the adjustment screw vertically moves the second collar relative to the first collar, the arm is pivotally coupled to the first collar, and the counterbalancer is pivotally coupled to the second collar so that rotation of the adjustment screw adjusts the position of the counterbalancer relative to the arm.

29. The apparatus of claim 28, wherein the counterbalancer includes a first member pivotable about the second pivot point, a second member slidably coupled to the first member and pivotable about the third pivot point, and a force-providing element having a first end coupled to the first member and a second end coupled to the second member, the first and second ends of the force-providing element being positioned to lie between the second and third pivot points.

30. The apparatus of claim 28, wherein each of the arm and the counterbalancer are coupled to the mount for pivoting movement about a vertical pivot axis.

31. The apparatus of claim 28, wherein the arm is formed to include a channel, a link is positioned to lie in the channel and a portion of the counterbalancer is positioned to lie in the channel.

* * * * *